July 26, 1949.  E. C. BREKELBAUM  2,477,169
WORK POSITIONER
Filed July 10, 1944  5 Sheets-Sheet 1
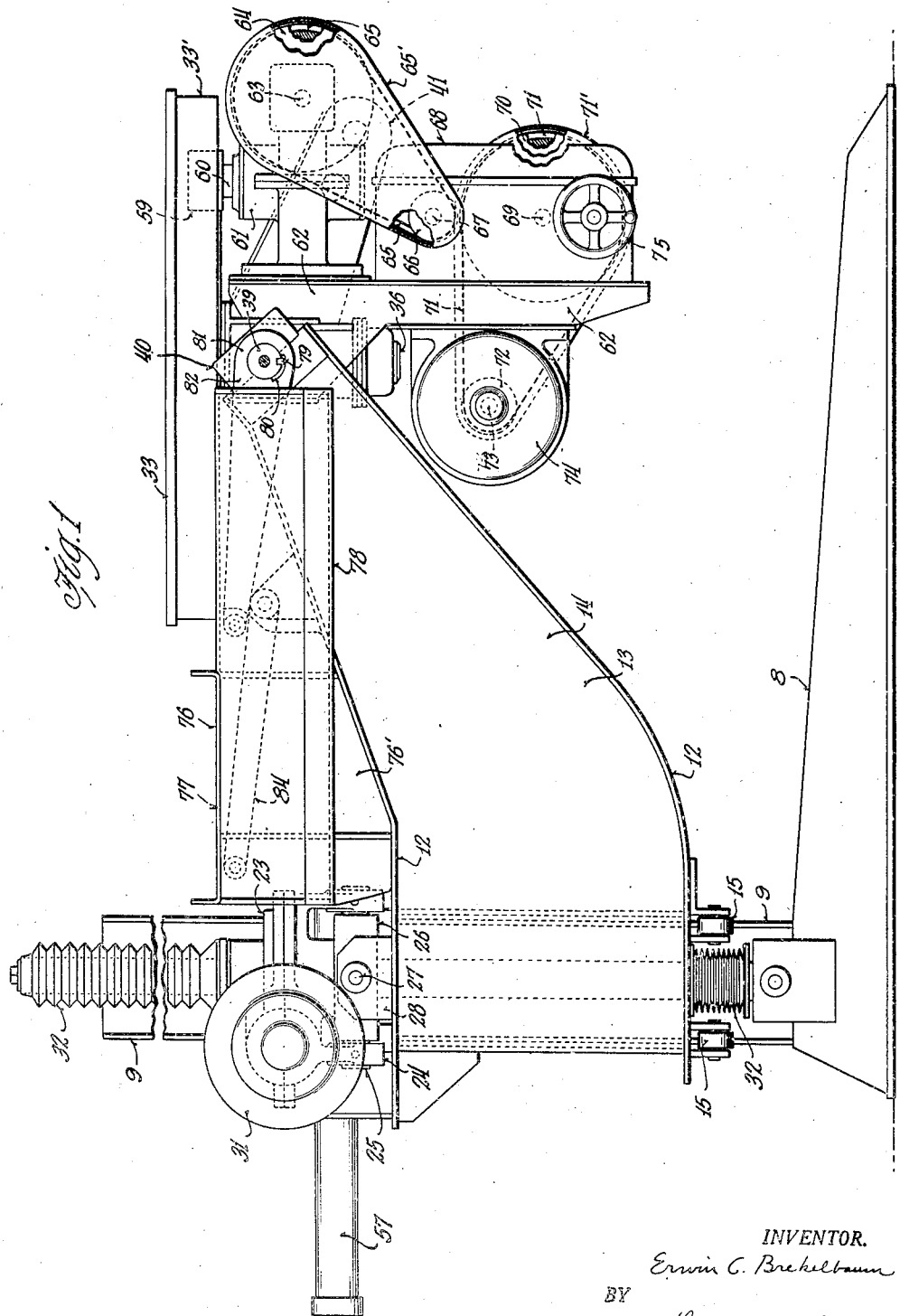
INVENTOR.
Erwin C. Brekelbaum
BY
David G. Fox
ATTORNEY.

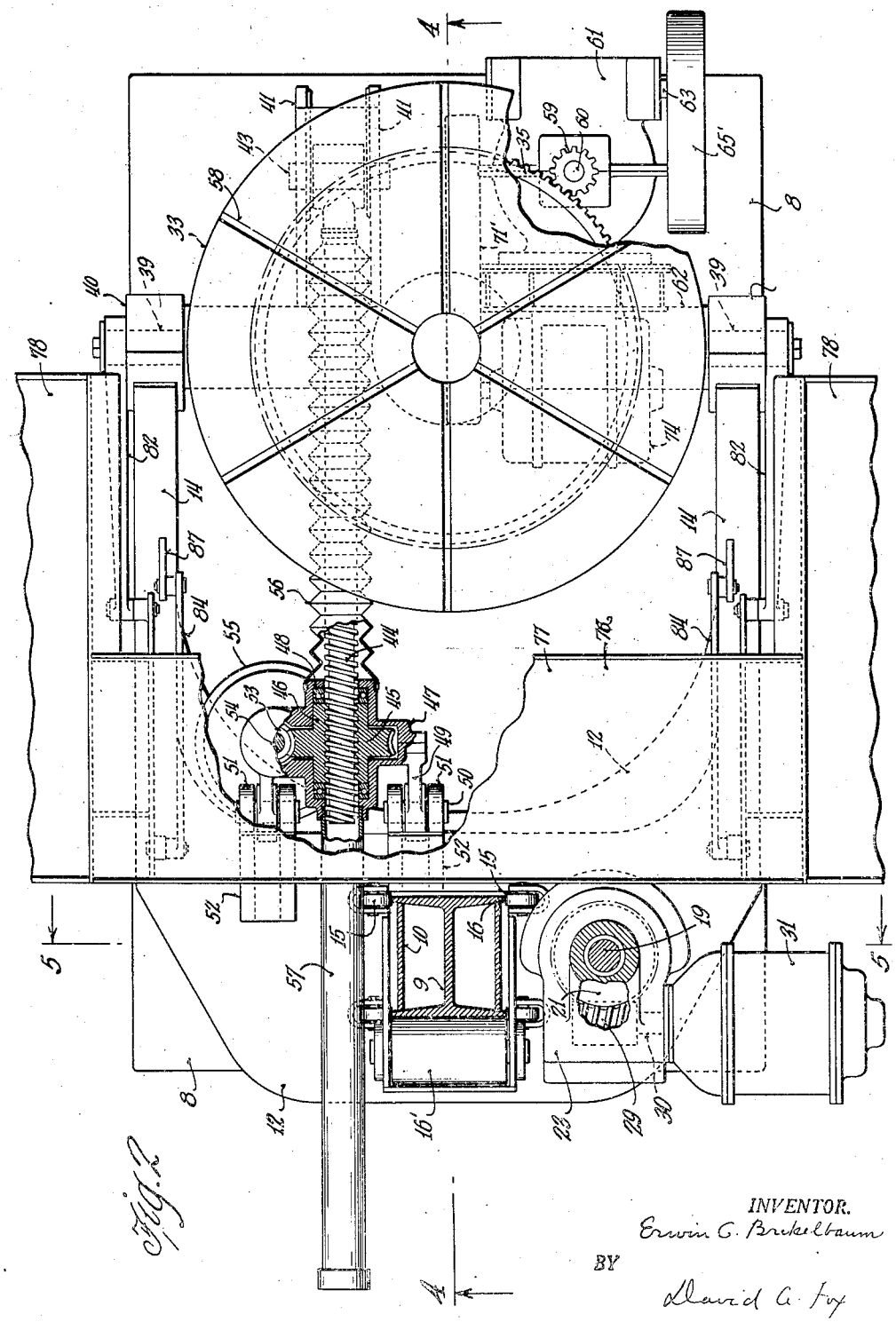

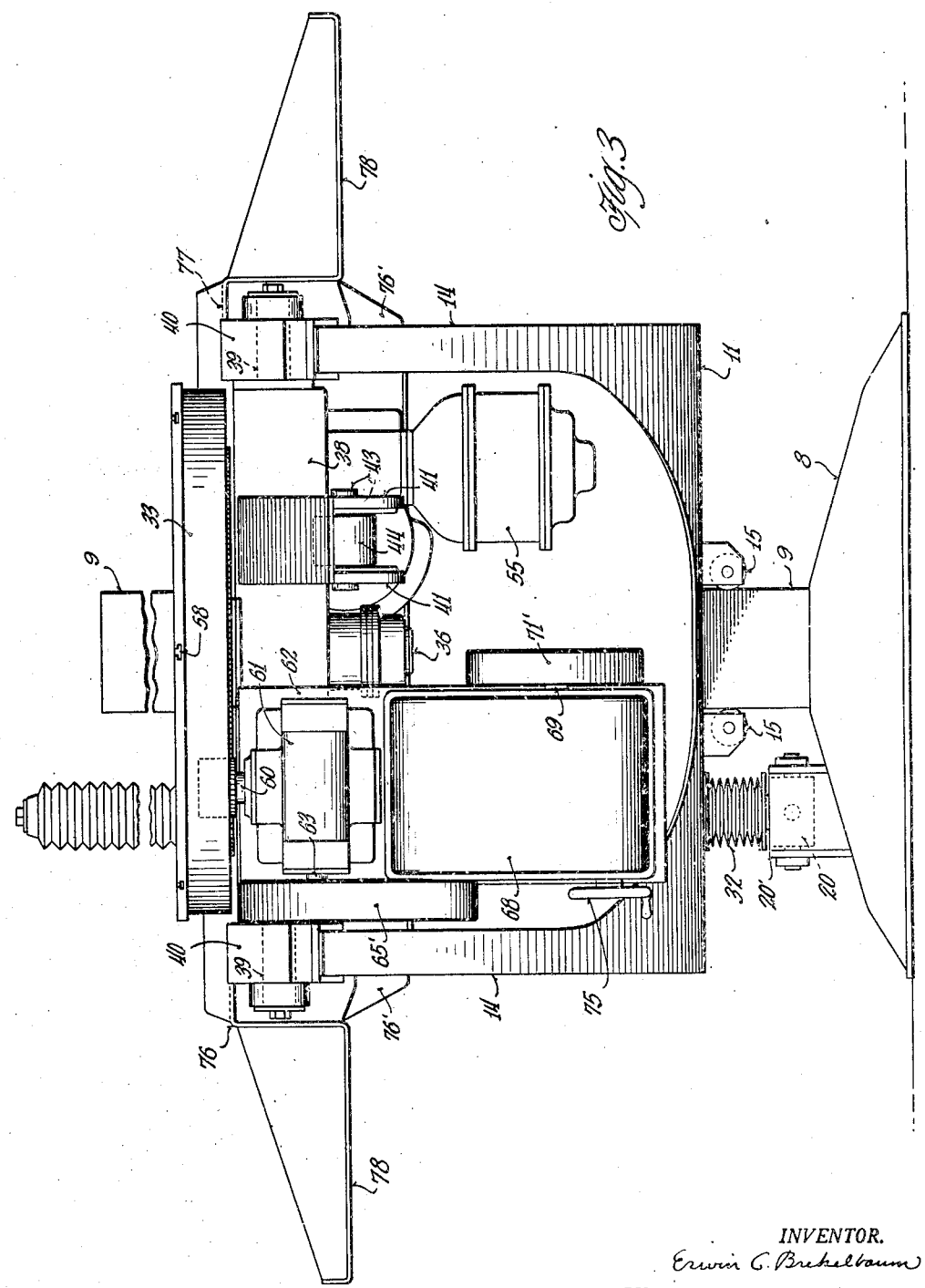

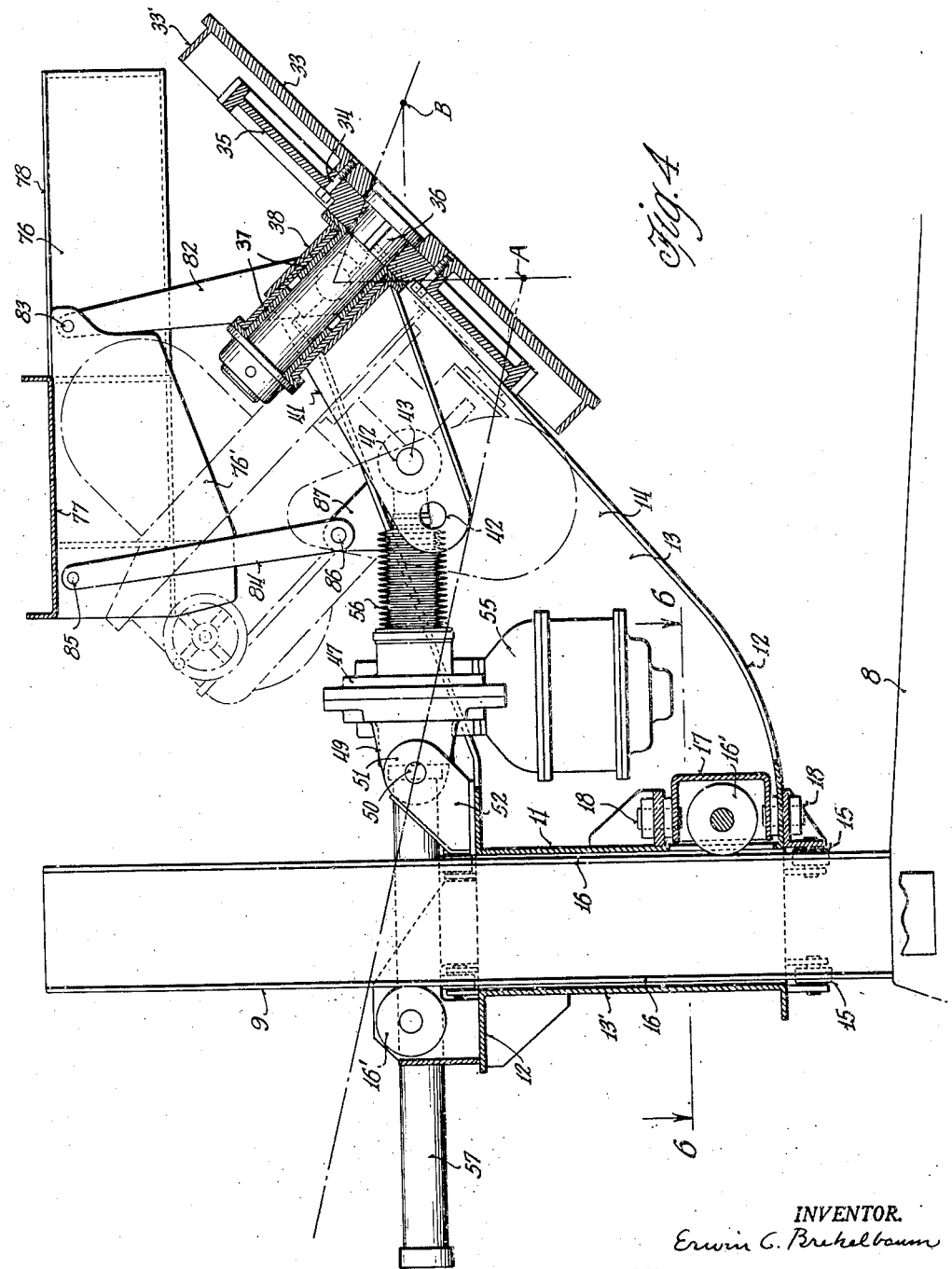

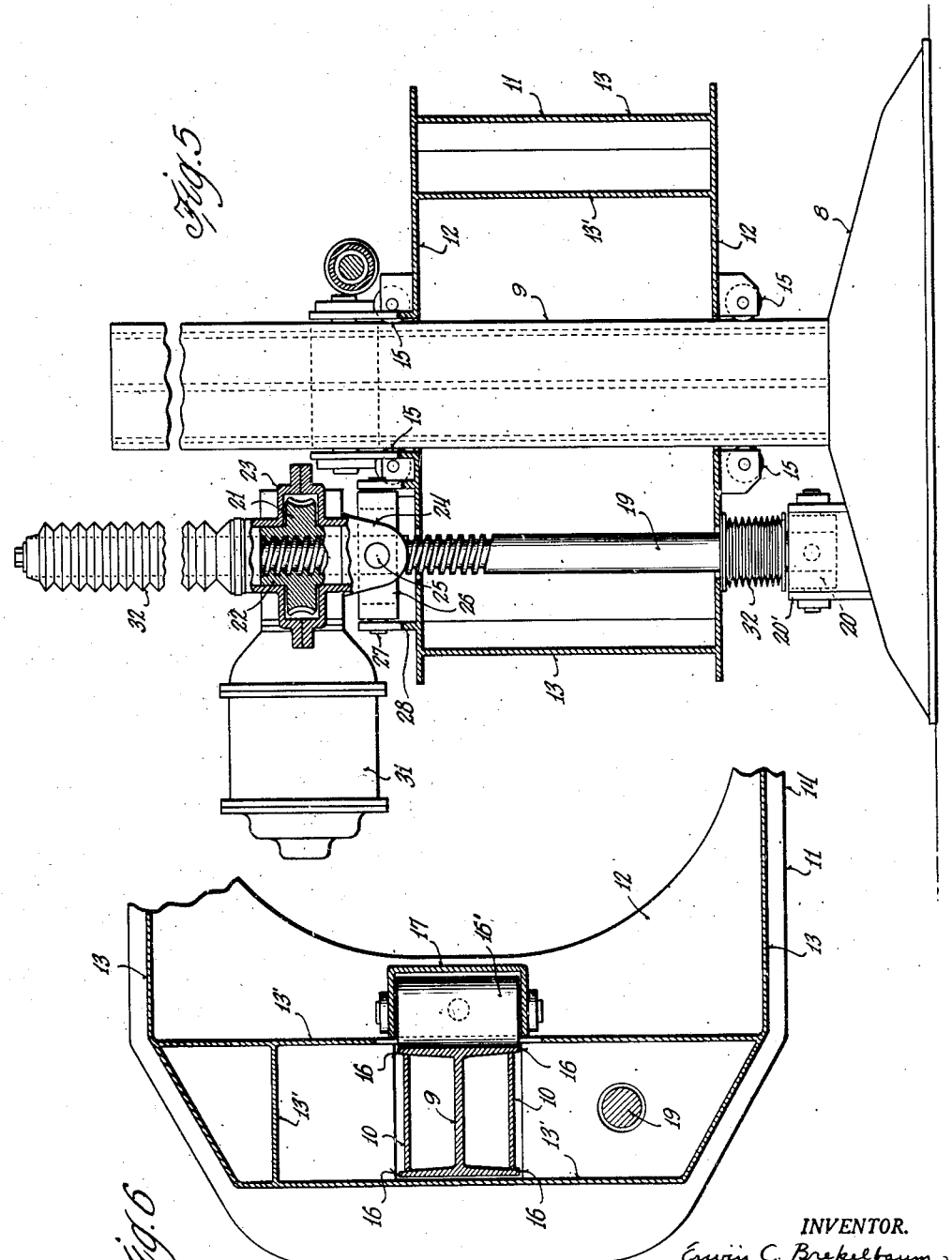

Patented July 26, 1949

2,477,169

UNITED STATES PATENT OFFICE 2,477,169

WORK POSITIONER

Erwin C. Brekelbaum, Milwaukee, Wis., assignor to Harnischfeger Corporation, Milwaukee, Wis., a corporation of Wisconsin Application July 10, 1944, Serial No. 544,290

6 Claims. (Cl. 29—288)

The invention relates to welding work positioners.

The general object of the invention is to provide a work positioner of simple and compact construction in which the table may be raised and lowered, rotated, and angularly tilted to the desired positions by power.

A further object of the invention is to provide a work positioner in which the table may be rotated at a speed which may be varied to best suit the work being welded.

A further object of the invention is to provide a platform that may be raised and lowered with the work supporting table and on which the operator can work on work disposed on the top of the table and which platform is automatically moved out of the way when the table is tilted to certain angular positions.

A further object of this invention is to provide an eccentrically positioned universally mounted elevating screw whose ends are preferably protected against depositing of welding material on it by accidental contact with the welding electrode.

A further object of the invention is to eliminate the usual exposed segmental tilting gear and use a longitudinally movable operating screw shaft which is preferably non-rotatable so that its ends may be covered to prevent accidental deposits of welding material interfering with its operation.

A further object of the invention is to protect the table turning gear against accidental deposits of welding material.

The invention further consists in the several features hereinafter set forth and more particularly defined by claims at the conclusion hereof.

In the drawings:

Fig. 1 is a front elevation view of a work positioner embodying the invention, parts being shown in section;

Fig. 2 is a plan view of the device, parts being broken away and parts being shown in section;

Fig. 3 is a front end elevation view of the device;

Fig. 4 is a vertical sectional view taken on the line 4—4 of Fig. 2;

Fig. 5 is a vertical sectional view taken on the line 5—5 of Fig. 2;

Fig. 6 is a horizontal sectional view taken on the line 6—6 of Fig. 4.

Referring to Figs. 1 and 2, the work positioner includes a support comprising a base 8 having an upright 9 of I-beam form secured thereto centrally of one end portion thereof, the space between the channels being partly covered by side plates 10.

A table supporting frame 11 of girder-like form (Figs. 4 and 5) and comprising top and bottom plate sections 12 and vertical plate sections 13 and 13' suitably welded together is vertically adjustably mounted on the upright 9 and provides a support with laterally extending spaced arms 14 overhanging the base 8. For guiding the frame 11 along the upright sets of rollers 15 are suitably journalled in parts of the top and bottom sections 12 and ride on the edges 16 of the flanges of I-beam 9. For resisting the canting thrusts due to the weight of the overhanging frame and the parts carried thereby large bearing rollers 16' are journalled on said frame at the top and bottom portions thereof and on opposite sides of said frame, the lower roller 16 being mounted in a bearing box 17 that is provided with trunnions 18 vertically pivotally mounted in portions of said frame 11.

Power operated means are provided for raising or lowering the frame 11 comprising an eccentrically positioned elevating screw 19 universally pivotally mounted at its lower end in a trunnion 20 pivotally mounted on a bracket mounting 20' secured to the base 8 and working through a motor driven nut 21 carried by said frame. As herein shown the nut is formed to provide a worm wheel whose hub portions 22 are journalled in the parts of a two part casing 23, the lower part of which is provided with depending ears 24 to receive trunnion pins 25 carried by an apertured block 26 through which the screw 19 passes and which has pin ends 27 pivoted in brackets 28 on the top plate section 12, the pins 25 and 27 being at right angles to each other to provide an universal joint connection between the nut 21 and the frame 11. The casing 23 forms a housing for a worm 29 on a shaft 30 of a reversible electric motor 31 carried by said housing. The screw 19 is protected at its exposed upper and lower ends by extensible boots 32 of leather or other suitable material to prevent the operator accidentally contacting said shaft with his welding electrode. Operation of the motor 31 rotates the worm 29 which meshes with teeth of the worm wheel nut 21, and this causes the nut to traverse the threaded screw shaft 19 to raise or lower the frame 11. By providing a universal mounting for the shaft 19 the eccentric mounting of this shaft relative to the frame 11 is made possible as any deflection of the frame 11 under load will not interfere with the operation of said shaft.

A large cylindrical work supporting table 33 is secured by bolts 34 to the hub of a large gear 35 that is keyed to a shaft 36 which is mounted in spaced shouldered bearing sleeves 37 that are suitably mounted centrally of a trunnion or pivot block 38 that has trunnion shafts 39 at its ends, each pivotally mounted in a two part journal bearing 40 carried on the outer end of each arm 14. The table has an annular flange portion 33' that forms a protecting shield for the gear 35 to prevent the operator accidentally contacting the gear with his welding electrode.

A lever arm is secured to the trunnion block 38 and has spaced arm portions 41 provided with spaced pivot pin holes 42 in either one of which a pivot pin 43 may be mounted to pivotally connect said arm with one end of a screw shaft 44 that works in a nut 45 which is in the form of a worm wheel whose hub portions 46 are journalled in the parts of a two part casing 47 that is also provided with thrust bearings 48. One part of this casing is provided with ears 49 to receive pivot pins 50 mounted in spaced ears 51 of brackets 52 mounted on the frame 11. The casing 47 also forms a housing for a worm 53 whose shaft 54 is journalled in said casing and forms a shaft of a reversible electric motor 55 carried by said housing. The screw 44 is protected at its exposed front end by an extensible boot 56 of leather or other suitable material and is protected at its rear end by a closed end tube 57 secured at its inner open end to the housing 47. Thus any accidental contact of a welding electrode with the screw 44 by the operator is prevented. Operation of the motor 55 rotates the worm 53 which meshes with the teeth of the worm wheel nut 45 so as to move the screw shaft 44 relative to the housing 47 and consequently the frame 11 so as to swing the levers 41 to different angular positions from the position shown in Fig. 4 through the position indicated by the point A to the extreme position indicated by the point B in which the table 33 is then in the horizontal position shown in Fig. 1.

The work supporting table 33 is provided with T-slot grooves 58 to take suitable T-head bolts for clamping the work in position on the table.

For turning the table the gear 35 meshes with a pinion 59 on a shaft 60 which is connected through a suitable worm and worm wheel drive, not shown in detail, but mounted in a housing 61 secured to a table carrying frame 62 with a shaft 63 carrying a pulley 64 connected by a belt 65 with a pulley 66 on a shaft 67 forming the out-put shaft of a variable speed transmission mechanism 68 whose in-put shaft 69 carries a pulley 70 connected by a belt 71 with a pulley 72 on a shaft 73 driven by a reversible electric motor 74. The belt and pulley drives above described run in suitable housings 65' and 71'. The motor and the variable speed transmission mechanism 68 are suitably secured to the table supporting frame 62 which frame is connected at its upper end to the trunnion block 38. The variable speed transmission may be of any suitable form such as a transmission of the Reeves type in which the speed ratios may be varied by turning a hand wheel 75.

With this construction operation of the motor 74 will through the belt drives above described and the transmission mechanism 68 turn the shaft 60 at different speeds and thus turn the pinion 59 and the gear 35 at the desired speed for rotating the table relative to its support 62.

A platform 76 has a portion 77 extending across the frame 11 and over the arm portions 14 thereof and side portions 78 extending along the sides of said arms, so that the operator may have ready access to different portions of the table when the table is in a horizontal position or when the table has been tilted to angles having a range of some 60° from a horizontal position. After reaching an angle of 60°, means are provided for shifting the platform out of the way of the table so it may be turned to angles from 60° to a vertical position or beyond as shown in Fig. 4. For this purpose the trunnion shafts 39 are provided with keys 79 that work in arcuate slots 80 in the hubs 81 of lever arms 82 (see Fig. 1) mounted on said trunnions until the table moves to the 60° position after which the keys 79 engage the hubs of said levers and swing said levers 82 upwardly carrying the platform 76 pivotally secured to the outer ends of said levers at 83 upwardly as the table moves to its extreme angular position shown in Fig. 4. For stabilizing the platform, during movement, links 84 are pivotally connected at one end 85 to the rear portion of the platform and at their other ends 86 to brackets 87 mounted on the arms 14. In its lowered position the depending portion 76' of the platform 76 rests on the tops of the arms 14.

From the above description it will be noted that the frame 11 may be raised or lowered to bring the table 33 to the desired position for the welder to work upon the work carried by the table, and when so positioned, the operator may either work from the platform 76 or from the floor depending upon the nature of the work, and if it is necessary to tilt the table from the horizontal position, this is accomplished through the operation of the tilt motor 55, the platform 76 being raised when the work is tilted to the angular positions previously mentioned. As the welding progresses, the operator may operate the table turn motor 74 so as to turn the table about its support 62 to different positions, and the speed at which the table is turned may be varied by adjustment of the hand wheel 75. The rate of swing of the table 33 and the load capacity may be varied by changing the position of the pivot pin 43 from the inner set of holes 42 to the outer set of holes 42 shown in Fig. 4.

I desire it to be understood that this invention is not to be limited to any particular form or arrangement of parts except in so far as such limitations are included in the claims.

What I claim as my invention is:

1. A work positioner comprising a support having an upright, a frame vertically adjustably mounted on said upright, a work table support mounted to swing in said frame at angles thereto, a work table mounted to turn in said support, a movable platform supported in one position of said table on said frame, and means operatively connecting said platform with said support for moving said platform above the table when said work table support moves to a predetermined angular position relative to said frame.

2. A work positioner comprising a support having an upright, a frame vertically adjustably mounted on said upright, a work table support mounted to swing in said frame at angles thereto, a work table mounted to turn in said support, a platform supported in one position of said table on said frame, and means for moving said platform above the table when the table moves to a predetermined position comprising lever arms connected to said table support and to said platform for moving said platform above said table in certain angular positions of said table relative to said frame.

3. In a work positioner, the combination of a base provided with an upright, a frame vertically guided on said upright, a screw shaft having a universal mounting connection at one end with said base and positioned outside said upright, a nut engaging said shaft and having a universal mounting and supporting connection with said frame including a drive shaft housing, a motor driven shaft journalled in said housing and having a geared connection with said nut to rotate the same to raise and lower said frame relative to said base and a motor carried by said supporting connections for driving said last named shaft.

4. A work positioner comprising a support having an upright, a frame mounted on said upright, a work table support mounted to swing in said frame at angles thereto, mechanism to swing said support to different angular positions, a work table mounted to turn in said support, a movable platform having a portion extending over the top of said frame and having overhanging side extensions and supported in one position of said table on said frame, and means operatively connected to the mechanism for swinging said work table support for moving said platform above the table when the table moves to a predetermined angular position relative to said frame.

5. A work positioner comprising a support having an upright, a frame mounted on said upright, a work table support mounted to swing in said frame at angles thereto including shafts having radially disposed projections, a work table mounted on said support, a platform supported in one position of said table on said frame, and lever arms journalled on said shaft and having arcuate slots in which said projections move to a predetermined angular position before engaging said levers, the outer ends of said levers being operatively connected to said platform for moving said platform above the table after said table has been moved to its predetermined angular position.

6. A work positioner comprising a support having an upright, a frame mounted on said upright, a work table support mounted to swing on said frame at angles thereto, mechanism to swing said support to different angular positions, a work table mounted to turn in said support, a movable platform supported in one position of said table on said frame, and means operatively connected to the mechanism for swinging said work table support for moving said platform above the table when the table moves to a predetermined angular position relative to said frame.

ERWIN C. BREKELBAUM.

REFERENCES CITED

The following references are of record in the file of this patent:

UNITED STATES PATENTS

| Number | Name | Date |
|---|---|---|
| 408,259 | Pintz | Aug. 6, 1889 |
| 1,211,381 | Alden | Jan. 9, 1917 |
| 1,233,434 | Zuck | July 17, 1917 |
| 1,617,165 | Rausch | Feb. 8, 1917 |
| 1,640,293 | Pitt | Aug. 23, 1927 |
| 1,801,831 | Aalborg | Apr. 21, 1931 |
| 2,097,920 | Hedgpeth | Nov. 2, 1937 |
| 2,178,264 | Meyer | Oct. 31, 1939 |
| 2,178,877 | Marvin et al. | Nov. 7, 1939 |
| 2,186,708 | Richardson | Jan. 9, 1940 |
| 2,311,525 | Ebbs | Feb. 16, 1943 |
| 2,318,791 | Mueller | May 11, 1943 |
| 2,339,020 | Le Tourneau | Jan. 11, 1944 |
| 2,396,161 | Cullen | Mar. 5, 1946 |

FOREIGN PATENTS

| Number | Country | Date |
|---|---|---|
| 555,110 | Great Britain | Aug. 4, 1943 |